March 24, 1970   R. PIETROCOLA   3,502,540
NOVEL COMPOSITE BUT MONLITHIC LAMINATED PLASTIC
AND PROCESS OF MANUFACTURING THEREOF
Filed June 26, 1968

INVENTOR
ROBERTO PIETROCOLA

BY OSTROLENK, FABER, GERB & SOFFEN
ATTORNEYS

3,502,540
NOVEL COMPOSITE BUT MONOLITHIC LAMINATED PLASTIC AND PROCESS OF MANUFACTURING THEREOF
Roberto Pietrocola, Via Cavriana 3, Milan, Italy
Continuation-in-part of application Ser. No. 436,535, Mar. 2, 1965. This application June 26, 1968, Ser. No. 747,414
Claims priority, application Italy, Mar. 4, 1964, 44,675/64
Int. Cl. B32b 27/06, 27/20; B29h 8/00
U.S. Cl. 161—165                             5 Claims

ABSTRACT OF THE DISCLOSURE

A novel composite laminated plastic material is prepared from impact resistant polystyrene. The laminate comprises two or three plies; an opaque backing sheet, a thin outer film, preferably containing an ultraviolet-radiation absorbing substance and, optionally, a thin colored ply placed between the outer film and the backing sheet. If desired a design may be printed on the inner surface of the thin outer film prior to lamination. If further desired, the surface of the material may be engraved or indented.

RELATED APPLICATIONS

This application is a continuation-in-part application of my copending application Ser. No. 436,535 filed Mar. 2, 1965, now abandoned and which claims priority from Italian application No. 44,675 filed Mar. 4, 1964.

FIELD OF INVENTION

Plastic laminates.

DESCRIPTION OF THE PRIOR ART

The formation of laminates from sheets of plastic materials is very well known. The lamination process has found great acceptance since it provides a means of coupling the characteristics, principally the strength characteristics of a backing material, with the appearance characteristics and the surface resistance characteristics of another material.

It has therefore been customary to produce laminates having a substantially thick backing sheet and a relatively far thinner outer layer which gives to the laminate the surface resistance and appearance characteristics desired in the final roduct. The lamination process generally comprises placing two or more sheets of plastic material in contact with each other and subjecting them to pressure and somewhat elevated temperature, for example by calendering to produce melt bonding between the layers. This process may optionally include a binding agent as well. It will be readily understood that the nature of the final product is determined in part by the backing sheet material utilized and also in part by the covering sheet material utilized.

Dyer (U.S. Patent No. 2,990,306) suggests the addition of ultraviolet resistant materials to the outer layer in order to protect the material from deterioration due to irradiation by ultraviolet light. The particular advantage in placing the ultraviolet resistant material in the outer sheet lies in the fact that a comparatively small amount of the radiation absorbing substance is required. This is of considerable commercial importance since these materials are expensive in relation to the basic polymeric substances and the addition of such protection would not be feasible commercially, if the protecting substance had to be added to the bulk material. Hence such protection is particularly suitable for laminates. In exemplifying his invention Dyer states that laminates may be produced from polymeric materials where the backing sheet or core is the same or different from that utilized as the surface layer of the laminate. Furthermore, he specifically discloses a laminate having a core of high impact strength polystyrene and a surface layer of unmodified polystyrene.

It should be noted that a certain amount of confusion exists in the nomenclature utilized in this area of the plastic art. For the sake of convenience, therefore, the following definitions will be used.

Pure (unmodified) polystyrene is polystrene which does not contain any additives or modifiers to affect either its resistance to ultraviolet radiation or which affects its mechanical strength.

Oriented polystyrene is pure polystyrene, similarly unmodified by additives which affect its resistance to radiation or which affect its mechanical strength. However, the oriented polystyrene generally exists in the form of a film which, during a stage of its production, has been stretched in one or in two mutually perpendicular directions parallel to the surface of the film. A film which has been stretched in one direction may be designated as mono-axially oriented polystyrene and a film which has been stretched in two directions mutually perpendicular to each other may be defined as bi-axially oriented polystyrene. This orientation process is fairly expensive in terms of equipment. However it has been found that pure, nonoriented polystyrene film is so lacking in mechanical strength as to severely restrict its utility in industrial processes. For example the pure unoriented polystyrene film breaks and tears very readily when subject to fairly minor mechanical stresses to which it would be subjected in, say, a lamination process.

It should be noted however that the mechanical strength imparted to oriented polystyrene film by the orientation process remains only so long as the film is not subjected to drastic heat treatment. Thus, if a laminate is formed utilizing a film of oriented polystyrene, be it mono-axially oriented or biaxially oriented polystyrene the surface characteristics of the laminate would be substantially the same as had that laminate been formed from unoriented, or pure, polystyrene. This fact arises because the mechanical strength of the oriented polystyrene arises from the orientation of the molecules of the polymer along one or two axes. Upon the application of heat, such as occurs in the lamination process, much of this orientation is lost and with it the mechanical strength which it carries with it. However some of the strains in the material caused by the orientation process remain.

It has been noted that laminates having a pure (initially oriented or unoriented) polystyrene surface layer exhibit relatively poor adhesion between the surface layer and the core, particularly under stress.

It is a further characteristic of polystyrene laminates having a surface layer of either pure or (initially) oriented polystyrene film that their surface has a highly glossy or polished appearance as well as low surface strength. (See Griff, Plastics Extrustion Technology, Reinhold, N.Y., 1968, p. 106, L. 36–39; Carhart et al.: Techniques for Securing Gloss, etc., SPE ANTEC 1962.)

The third form of polystyrene commonly used in the plastic arts is impact resistant polystyrene. While as a descriptive term impact resistance is recognized as being relative, as a term of art impact resistant polystyrene is recognized as signifying polystyrene which has been modified by rubber or a rubber-like polymer. This modification may be achieved in one of three ways.

The polystyrene may be mixed with rubber or a rubber-like polymer and the mixture extruded to produce a film of impact resistant polystyrene, or styrene may be copolymerized with a monomer such as butadiene which itself gives rise to rubber-like polymers and then forming the film of impact resistant polystyrene similarly by extrusion. However the most common method of preparation is to polymerize styrene in the presence of rubber or a rubber-like polymer collecting the resultant mixed polymer and forming the film of impact resistant polystyrene similarly by extrusion.

As stated above, it is well-known that pure polystyrene is a somewhat brittle substance. This brittleness may be somewhat modified by the orientation procedure similarly described above. In impact resistant polystyrene, however, there is produced a rather tough polymer. The strength of this polymer is derived from the existence therein of what is essentially a two-phase system. It is the existence of these two phases in the impact resistant polystyrene which provide energy-absorbing linkages which in turn provide the desired strength.

Impact resistant polystyrene has long been used as the core material for plastic laminates due to its inherent mechanical strength properties. Heretofore however impact resistant polystyrene has not been considered as a material for use as the surface layer of laminates because of poor gloss and presumed opacity.

It must be understood that in the formation of laminates which are utilized as articles of commerce their mere mechanical strength is not the sole factor to take into consideration. Laminates are usually produced in order to simulate other materials which are too expensive or impractical to use under the particular circumstances contemplated. Such materials may be as various as brick, stone, or wood. Thus the ability of a laminate material to be fabricated to closely simulate the appearance of the material for which it is to be regarded, at least in part, as a substitute is a matter of prime commercial importance. The esthetic appearance of a laminate is a matter which far more than its mechanical properties, though not of course exclusive of the mechanical properties, may determine its commercial feasibility. Thus if a material possesses a cheap, and obviously synthetic, appearance its chances of commercial success would be vastly reduced in comparison with a material which more closely simulates the appearance of the natural product.

In the formation of laminates it has been customary to print the design which will control the appearance of the final product on the inside surface of the surface layer, that is to say the surface of the surface layer which will ultimately be bonded to the core or backing sheet. The reason for this proceeding is that were the design to be printed upon the outside or upper surface of the surface layer it might be readily marred or scratched off during the course of the life of the laminate. This manner of proceeding is readily applicable to pure and to oriented polystyrene film since these films are substantially transparent in all the commercially available and feasible film thicknesses.

However one negative characteristic of impact resistant polystyrene is its relative opacity. The presence of the modifying rubber or rubber-like polymer produces a material which, to all intents and purposes, is opaque in currently available commercial thicknesses. Thus heretofore it has not been considered to manufacture a laminate possessing the highly desirable mechanical characteristics of a laminate having a surface layer of impact resistant polystyrene since such a laminate could not clearly show a design through the surface thereof which had been printed on the underside of the surface layer in what is now the commercially accepted mode of proceeding.

SUMMARY OF THE INVENTION

The novel products of the present invention are plastic laminates comprising a core or backing layer of impact resistant polystyrene and a surface layer of impact resistance polystyrene film of such a thickness that said film is substantially transparent. Optionally there may be introduced between the surface layer film and the core a film of colored material. It is within the contemplated scope of the invention that the surface layer may be placed on either one or both sides of the core portion of the laminate.

The particular advantages of utilizing a film of impact resistant polystyrene in place of pure or oriented polystyrene as the surface layer are both mechanical and esthetic.

As stated above, pure, unoriented polystyrene is not usually used as an industrial film due to its handling problems.

The use of the oriented polystyrene as a film coating gives rise to a certain amount of brittleness in the laminate due partially to the basic brittle characteristic of the unoriented polystyrene (since a certain amount of disorientation occurs during the lamination process) and also to the internal strains in the polystyrene due to the residual orientation.

Oriented polystyrene (as well as pure polystyrene) possess mechanical properties which are quite different from those of the impact resistant polystyrene core. Thus since the laminate is thus comprised of plies of different constitution the mechanical strength and machinability of the laminate are considerably lower than those of the monolithic product of the present invention which is formed from impact resistant polystyrene film and impact resistant polystyrene core. It is a further advantage of impact resistance polystyrene surface layers that they show superior adhesion to a core of impact resistant polysyrene than do surface layers of pure and pure oriented polystyrene.

While a major commercial form for the products of the present invention are sheets which are produced by extrusion a further form is in articles formed from the sheets. In the latter form it has been found that unmodified polystyrene (oriented form) is highly unsuitable as a surface layer. Thermoforming must be carried out under more critical conditions to obtain a product free of surface bubbling. However the molded article obtained is very shiny and the surface layer has very poor impact strength and adhesion may be faulty.

By utilizing extremely thin impact resistant polystyrene film as the surface layer the laminates of the present invention have turned to specific commercial advantage the cloudy opaque apperance of impact resistant polystyrene.

Since the film of impact resistant polystyrene is so thin as to be transparent or virtually so, the overall effect of these novel laminates is one of a mat, nonshiny appearance which is esthetically and commercially highly desirable in the synthetic wood veneers which constitute an important use of the product of the present invention.

Thus although plastic laminates of polystyrene using impact resistant polystyrene as a core and oriented or otherwise unmodified polystyrene as the surface layer are known and although the general concept of monolithic laminates has been disclosed in the art, the particular and important advance of utilizing a very thin surface layer of impact resistant polystyrene over a core of impact resistant polystyrene comprising the present invention is entirely novel and unsuggested by the art.

DESCRIPTION OF THE PREFERRED EMBODIMENTS

The product of the present invention comprises a rigid backing layer 10 of impact resistant polystyrene. The thickness of this layer is in no way critical to the present invention and may be varied in any way in order to provide the desired product. Thicknesses of the order of 1 to 2 millimeters have been found useful. This backing layer may be pigmented or unpigmented as desired.

The product further comprises a surface layer 12 also of impact resistant polystyrene. It is a critical feature of this invention that the surface layer shall be thick enough to be mechanically handleable by industrial equipment and yet thin enough to be substantially transparent. It has been found that the limits of thickness which satisfy these criteria lie substantially between a minimum of 20 microns and a maximum of 100 microns.

In the preferred embodiment of the present invention the underside of the surface layer, that is to say the side of the surface layer which is to be bonded to the core of the laminate, has printed thereon a design which is clearly visible through the thickness of the surface layer when viewed from the upper side of said surface layer.

In a further embodiment of the present invention the surface layer may contain an ultraviolet radiation absorbing substance. Any ultraviolet radiation absorbing substance known to the art may be utilized provided that it has no substantial effect upon the transparency of the surface layer.

In yet another embodiment of the present invention the laminate may optionally contain a thin colored ply 11 placed between the surface layer film and the core. This colored ply is made of impact resistance polystyrene in order to preserve the mechanical characteristic of a monolithic laminate. If desired a further design may, optionally, be printed upon the upper surface of said intermediate ply which surface will, of course, be bonded to the underside of the surface layer. The thickness of layer 11 is not critical to the invention. However thicknesses of the order of 300 to 400 microns have been found useful.

This manner of producing the novel laminates of the present invention may be illustrated by the following variants, it being understood that the apparatus utilized and the temperature and pressure conditions for operating the apparatus would be well-known to one skilled in the art.

It is to be understood that in all variants illustrated below, the surface layer 12 has, where desired, had a design previously printed on the side thereof which will be bonded either to the intermediate layer or to the core layer.

Figure 1:
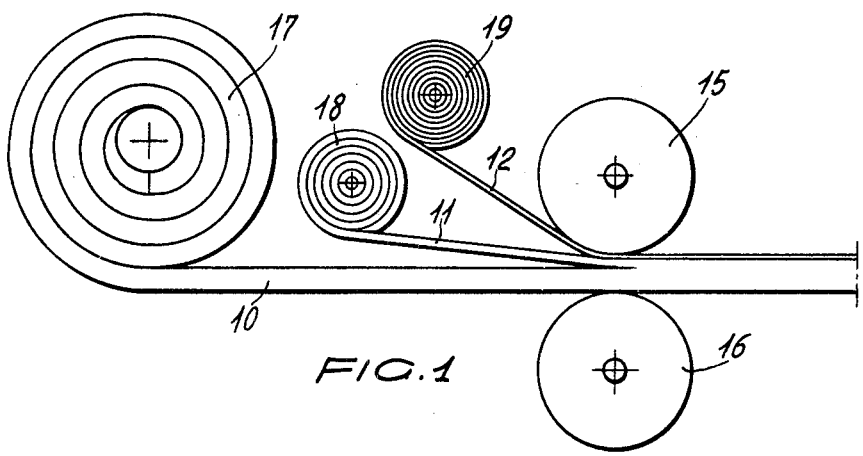
FIGURE 1 represents schematically, one embodiment of a manufacturing process in longitudinal section of schematic production equipment.

In the variant illustrated by FIGURE 1 the three layers 12, 11 and 10, are wound on storage rolls 19, 18 and 17, respectively and fed through contact rolls 15 and 16 under conditions of temperature and pressure which bond the layers together into a sheet of the final product. Where desired the contact rolls may be so constituted as to emboss a pattern upon the final product. For example the surface of the cylinders may be equipped with polished chrome plate to impart a glossy surface or the cylinders may be sanded to impart a mat finish. In a further alternative the cylinders may be etched or relief patterned to impart an embossed finish. Particularly desirable are those patterns which simulate the natural pores and grain of wood.

In a variant of the process illustrated in FIGURE 1 (but not shown herein) the backing layer or core 10 is supplied directly to the contact rolls in the melted state from a flathead extruder rather than being supplied in the form of finished sheet. In this variant surface layer 12 and coloring layer 11 are fed to the contact rolls in a similar manner as that set forth hereinabove.

Figure 2:
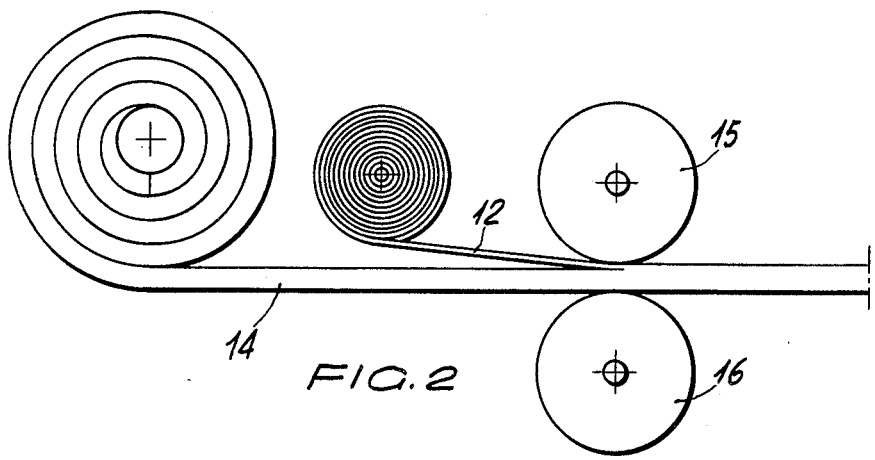
FIGURE 2 is a longitudinal section of a second such embodiment.

In the variant illustrated by FIGURE 2 the core and coloring functions are incorporated in layer 14 which together with surface layer 12 are fed to contact rolls 15 and 16 which may of course be embossed or treated in a manner similar to that set forth above.

In a modification of this variant (not illustrated) the coloring and backing layer 14 may be supplied to the contact rolls directly from a flathead extruder in the melted state.

In yet another modification (not illustrated) the protective surface layer 12 and the coloring layer 11 are previously combined and bonded together in a manner similar to that illustrated by FIGURE 2, and the combined layers 12 and 11 fed to a second set of contact rolls together with backing layer 10 or 14. If desired this backing layer may be supplied either in the form of previously produced sheet or directly from a flathead extruder.

It will thus be seen that the product of the present invention may be produced by several methods. It is particularly to be stressed that it is not the intention to limit the method of producing the products of this invention to extrusion but that other methods, in particular calendering or a noncontinuous laminating process, are to be considered within the purview of the present invention.

The embodiments of the invention in which an exclusive privilege or property is claimed are defined as follows:

1. A composite laminated plastic material comprising:
   (1) a thin, substantially transparent, surface layer of impact resistant polystyrene bonded to
   (2) a thicker backing layer of impact resistant polystyrene.

2. A material according to claim 1, wherein the surface layer additionally comprises an ultraviolet radiation absorbing substance.

3. A material according to claim 1, wherein the thickness of the surface layer is between 20 microns and 100 microns.

4. A material according to claim 1, wherein the side of the surface layer bonded to the backing layer has a design printed thereon.

5. A material according to claim 1 comprising additionally a colored film of impact resistant polystyrene as a component of the laminate placed intermediately between the surface layer and the core.

References Cited

UNITED STATES PATENTS

| | | | |
|---|---|---|---|
| 2,815,308 | 12/1957 | Robinson et al. | 161—247 |
| 2,987,103 | 6/1961 | Yakubik | 161—254 |
| 2,990,306 | 6/1961 | Dyer | 161—254 |

WILLIAM J. VAN BALEN, Primary Examiner

U.S. Cl. X.R.

156—306; 161—247, 252, 253